United States Patent Office 2,776,232
Patented Jan. 1, 1957

2,776,232

MIXED α-CYANOACRYLATE ADHESIVE COMPOSITIONS

Newton H. Shearer, Jr., and Harry W. Coover, Jr., Kingsport, Tenn., assignors to Eastman Kodak Company, Rochester, N. Y., a corporation of New Jersey No Drawing. Application June 2, 1954,
Serial No. 434,080

11 Claims. (Cl. 154—46)

This invention relates to adhesive compositions particularly adapted for forming flexible adhesive bonds and is particularly concerned with adhesive compositions comprising a mixture of at least two different esters of α-cyanoacrylic acid.

The α-cyanoacrylate esters, in monomeric form, have found excellent utility for a great variety of adhesive applications. These monomeric compositions form strong adhesive bonds at room temperature and without the application of pressure or the use of a polymerization catalyst. Such adhesive compositions and their use is disclosed and claimed in the copending application of Coover and Shearer, Serial No. 318,325, filed November 1, 1952.

It is an object of this invention to provide new and improved α-cyanoacrylate adhesive compositions which form adhesive bonds which are more flexible than the adhesive bonds ordinarily obtained from the single α-cyanoacrylate adhesives.

Another object of the invention is to prepare new mixed monomeric α-cyanoacrylates by a process which lends itself to ready depolymerization of the low molecular weight polymeric α-cyanoacrylates which are normally formed in the manufacturing process.

Another object of the invention is to provide adhesive compositions which are particularly adapted for bonding together flexible materials without giving a relatively inflexible bond.

Another object of the invention is to provide a means for regulating the bonding speed of α-cyanoacrylate adhesives by adjusting the composition of the adhesive compositions.

Other objects will be apparent from the description and claims which follow.

These and other objects of the invention are attained as described more fully hereinafter with particular reference to certain preferred embodiments of the invention.

The adhesive compositions of this invention comprise mixtures of at least two different α-cyanoacrylates from the class having the formula

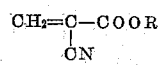

in which R is an alkyl group of from 1 to 16 carbon atoms, a cyclohexyl group, or a phenyl group. In the compositions of the invention, each of the monomeric esters forms at least 5% of the total weight of the mixture. The compositions desirably include an acidic polymerization inhibitor in an amount sufficient to inhibit the bulk polymerization of said mixture.

Monomeric α-cyanoacrylate esters are readily prepared by reacting a suitable α-cyanoacetate with formaldehyde in the presence of a basic condensation catalyst to form a low molecular weight polymeric α-cyanoacrylate ester. This low molecular weight polymer is then heated under vacuum and in the presence of a polymerization inhibitor, whereby monomeric vapors are evolved which can be condensed and collected. The condensation of the α-cyanoacetate with the formaldehyde can be effected using aqueous solutions of formaldehyde, or it can be effected in a nonaqueous system employing anhydrous formaldehyde or a polymeric form thereof such as p-formaldehyde. The nature of the monomeric α-cyanoacrylate will depend upon the particular cyanoacetate ester which is employed in the condensation. In practicing this invention, unmixed monomeric α-cyanoacrylates can be prepared by any of the well known methods such as those described in the copending application of Joyner and Hawkins, Serial No. 415,422, filed March 10, 1954, in which unmixed compositions are prepared by depolymerizing the individual polymeric α-cyanoacrylates; or the mixed monomeric esters can be prepared together by reacting a mixture of α-cyanoacetate esters with the formaldehyde, whereby a mixed polymer is obtained which can be depolymerized to give the compositions of this invention directly.

Thus any of the α-cyanoacetates wherein the ester group is either an alkyl group of from 1 to 16 carbon atoms, a cyclohexyl group, or a phenyl group can be used in practicing the invention. The condensation is readily catalyzed by any of the basic condensation catalysts which are known to the art. Thus the catalysts can include such materials as the inorganic bases such as sodium or potassium hydroxide, ammonia or ammonium hydroxide, the organic bases such as quinoline, pyridine, piperidine, isoquinoline, dialkyl amines such as diethyl amine, alkali metal alkoxides such as sodium or potassium methoxide or ethoxide, or similar well known basic materials. The amount of catalyst is not critical and can be varied as desired. Ordinarily, a relatively small amount of basic catalyst such as about 0.001% to about 0.5% by weight is adequate. Larger amounts can be used but are not necessary and may be disadvantageous in some cases, particularly if they are carried over into the polymeric product and hence into the monomeric product, since basic materials catalyze the polymerization of α-cyanoacrylate monomers. The reaction between the cyanoacetate and the formaldehyde is readily effected by heating the reaction mixture to a temperature of about 50 to 90° C.

When the compositions of this invention are prepared by admixing preformed α-cyanoacrylate monomers, a single α-cyanoacetate as defined is used in the preparation. For example, the cyanoacetate can be methyl cyanoacetate, ethyl cyanoacetate, propyl cyanoacetate, butyl cyanoacetate, capryl cyanoacetate, decyl cyanoacetate, cyclohexyl cyanoacetate, phenyl cyanoacetate, lauryl cyanoacetate, or any of the other cyanoacetates wherein the alkyl group contains from 1 to 16 carbon atoms.

In practicing the invention, the reaction is desirably carried out in solution in a nonaqueous organic solvent which distills at a temperature below the depolymerization temperature of the low molecular weight polymer formed by the reaction. The solvent used can be any of the non-ionizable organic solvents which do not affect the course of the reaction. After the condensation reaction has been completed, a quantity of the solvent may be removed by distillation. In carrying out the process, it is then desirable to introduce into the reaction mixture an organic solvent which is capable of forming an azeotrope with the water, whereby the removal of the water with the remaining solvent is facilitated. The azeotropic solvent can be introduced initially and form the solvent medium for the reaction itself, or it can be introduced initially in admixture with another organic solvent, or it can be introduced into the reaction mixture after the reaction has been effected and prior to the separation of the reaction solvent. In most cases, the solvent which is employed will be one which is at least partially miscible with water, although solvents which are immiscible with water can be used in some cases with slightly less advantageous results. Among the reaction solvents which are preferably employed are the monohydric alcohols, and particularly the lower alkyl monohydric alcohols such as methanol, isopropanol, butanol or the like; aliphatic ethers, and particularly the lower dialkyl ethers such as diethyl ether, diisopropyl ether and the like; benzene, chloroform, cyclohexane, or similar well known organic solvents which distill at a temperature below the temperature of that employed for depolymerizing the α-cyanoacrylate polymer. To remove the water formed during the reaction, benzene and similar solvents which readily form azeotropes with water are desirably employed. They may be the sole solvent for the reaction, or, alternately, they may be added at any time after the completion of the reaction to facilitate removal of the water formed.

Following the reaction between the cyanoacetate and the formaldehyde, the solvent and water are separated from the polymeric product. This separation is readily effected by distilling out the mixture of organic solvent and water from the reaction mixture. Using an azetrope-forming solvent such as benzene, the reaction solvent, water, and the benzene can usually be distilled off as a tenary azeotrope, and the water content of the polymer is reduced to a value of less than 0.4%. In some cases, it may be desirable to distill off part of the reaction solvent from the reaction mixture when such solvent is not an azeotrope-forming solvent. This is done in the preferred method before adding to the reaction mixture an azeotrope-forming solvent, such as benzene, since the water formed during the reaction stage remains in the reaction mixture even when the solvent content has been reduced by as much as 80 to 90 percent. It is necessary, of course, that the azeotrope distill at a temperature below the depolymerization temperature of the polymeric product. In most cases, however, this is not a problem using the volatile organic solvents, since depolymerization is usually effected by heating the polymeric product at a temperature of the order of 100–150° C. under a vacuum of the order of 1 mm. Hg.

The substantially anhydrous crude polymer thus obtained as a residue can then be directly depolymerized without the necessity of a further drying operation. Depolymerization is usually effected by heating the polymer under reduced pressure and in the presence of a polymerization inhibitor. In some cases, it may be desirable to include a plasticizer such as tricresyl phosphate to give a low melting and readily depolymerized polymer, although this is not necessary for successful operation. Because of the inherent instability of the monomeric α-cyanoacrylates, it is desirable to effect the depolymerization in the presence of a polymerization inhibitor, even though the low water content of the polymer gives increased stability to the monomer. Any of the acidic inhibiting substances can be used, including phophorus pentoxide, antimony pentoxide, picric acid, hydroquinone, tertiary butyl catechol, metaphosphoric acid, maleic anhydride, ferric chloride, or the like. A particularly desirable group of polymerization inhibitors are the acidic gaseous inhibitors such as sulfur dioxide, nitric oxide, hydrogen fluoride, and the like. Usually it is desirable to include a polymerization inhibitor in the reaction vessel containing the polymer being depolymerized, and also to collect the monomeric vapors in a receiving vessel also containing a polymerization inhibitor. Best results are obtained by also introducing into the system a stream of gaseous inhibitor which mixes with the monomeric vapors evolved during the depolymerization and dissolves in such vapors to some extent when the vapors are condensed. Phosphorus pentoxide is desirably employed in the depolymerization vessel, and sulfur dioxide is desirably introduced into the system as the gaseous inhibitor. A particularly stable composition is obtained when the receiving flask contains a small amount of hydroquinone, whereby a monomer composition is obtained which contains a mixture of sulfur dioxide and hydroquinone.

Since the polymers prepared in accordance with this invention melt readily at a temperature of 75 to 95° C., the process can be readily carried out in continuous fashion since the solvent can be removed from the crude reaction mixture, the polymers melted and caused to flow into a depolymerization vessel. If desired, however, the process can be carried out batchwise with good results. The improved stability which is obtained by means of a mixture of sulfur dioxide and hydroquinone are disclosed in the copending application of Coover and Dickey, Serial No. 409,756, filed February 11, 1954.

The individual monomeric α-cyanoacrylate esters prepared in this manner can then be admixed in amounts of from 5 to 95% by weight of one monomer with from 95 to 5% by weight of a different monomer prepared as described.

Desirably, however, the mixed monomers are prepared by using a mixture of any two or more of the α-cyanoacetates as defined herein. In many cases, it is desirable to employ methyl α-cyanoacetate as one of the cyanoacetates used in preparing the compositions of the invention. Good results are obtained, however, using many mixtures of at least two alkyl cyanoacetates or mixtures of one or more alkyl cyanoacetates with phenyl cyanoacetate or cyclohexyl cyanoacetate. In the preparation of the monomers the use of mixed α-cyanoacetates has the advantage of giving a mixed polymer which is more readily depolymerized than are the unmixed cyanoacrylate polymers. Thus the depolymerization can be effected at a lower temperature using such mixed α-cyanoacetates.

The relative proportions of the monomers in the compositions of this invention can be varied as desired depending upon the characteristics desired. Generally speaking, the higher esters of α-cyanoacrylic acid bond more slowly than those of the lower alkyl esters. As a consequence, a mixture of capryl α-cyanoacrylate with methyl α-cyanoacrylate results in a composition which polymerizes more slowly than does monomeric methyl α-cyanoacrylate alone. This more gradual setting of the adhesive bond has advantages in certain applications. For example, it is often desirable to make minor adjustments in the positions of the two articles being bonded before the bond sets up.

One of the primary advantages of the compositions embodying this invention is the fact that the adhesive bonds formed therefrom are considerably more flexible after polymerization than are the bonds of homopolymers of α-cyanoacrylates. This is particularly desirable when bonding films, textiles, rubbery materials, and similar articles wherein a pliable rubbery bond is desired. It may also be desirable in bonding rigid articles where the bonded article may be subject to sudden shocks, and where it is desired to have an adhesive bond which permits a slight cushioning effect in the bonded layer. In many cases, the mixed compositions of this invention have superior adhesive properties, particularly in the case of flexible materials, to the unmixed esters.

The adhesive compositions can be effectively stabilized by the inclusion of any of the acidic gaseous polymerization inhibitors such as sulfur dioxide, nitric oxide, boron trifluoride, hydrogen fluoride, and similar materials. Usually it is necessary to employ the stabilizer in an amount of at least 0.001% by weight based on the weight of the monomeric mixture for adequate stabilization. Usually the stabilizer content in the adhesive composition is maintained below about 2% by weight based on the weight of monomer in order that the composition will polymerize rapidly when spread in a thin film. The 2% level of stabilizer is effective to prevent bulk polymerization of the adhesive over prolonged periods of shelf storage. Compositions containing above 2% by weight of stabilizer are within the scope of the invention, however, and the stabilizer content can be reduced to the desired level immediately before use. Thus, for example, when the stabilizer is a normally gaseous material such as sulfur dioxide, the content can be reduced below 2% by subjecting the adhesive composition to reduced pressure immediately before use.

An important advantage of the α-cyanoacrylate adhesive compositions is the fact that no heat or catalyst is normally required to cause setting up of the adhesive bond. This is of particular advantage in the fabrication of articles from irregularly shaped elements where the application of heat or pressure is difficult. If desired, however, a basic catalyst or heat or pressure, or a combination of these, can be employed for accelerating the polymerization of the adhesive film. This is particularly true when at least one of the esters in the mixed ester compositions of this invention is a higher ester which normally polymerizes less rapidly than the lower alkyl esters such as methyl α-cyanoacrylate.

As has been indicated, the bonding of flexible articles is readily carried out by merely spreading a thin film of the adhesive composition on one or more of the surfaces to be bonded and bringing the coated surfaces into contact. The bond which is formed by the compositions of this invention has a flexible character, whereby the bonded area does not become hard and inflexible in contrast to the remainder of the article. This is a particular advantage when bonding such flexible materials as plastic films, textiles, paper and the like where the presence of a rigid area is undesirable.

The compositions of the invention normally possess a relatively low viscosity which permits the adhesive composition to completely cover the surface to be bonded and to flow into any minor irregularities in the surface. In some cases, however, it may be desirable to increase the viscosity of the adhesive composition in order to prevent undue flow of the composition during application. This can be readily accomplished by adding up to 25% by weight of a suitable polymeric material which is soluble in the mixed monomer. Typical polymeric materials which can be used for increasing viscosity include the polymeric alkyl cyanoacrylates, polyacrylates, polymethacrylates, cellulose esters, and similar well known polymeric additives.

The invention is illustrated by the following examples of certain preferred embodiments thereof. It will be understood, however, that the examples are included to illustrate the invention and are not intended to limit the scope of the invention as defined herein unless otherwise specifically indicated.

*Example 1*

A mixture of 38 g. of ethyl cyanoacetate, 33 g. of methyl cyanoacetate, and 8 drops of piperidine was added dropwise over a period of 20 minutes to 54 g. of 37% aqueous formaldehyde preheated to 80° C. The reaction was exothermic and no external heating was required to maintain the reaction temperature at 80–90° C. during the addition. Heating was continued at 80–90° C. for 30 minutes after the addition was completed. The resulting mixed low molecular weight α-cyanoacrylate polymer was light yellow in color and could be poured while molten into a suitable vessel in which it was allowed to harden. This polymer was then separated from unreacted reactants, ground, dried and mixed with 4% phosphorus pentoxide and 1.5% hydroquinone. This mixture was then heated under reduced pressure to effect depolymerization. The depolymerization began at a temperature below 200° C. which was in marked contrast to depolymerization temperatures of at least 220° C. which are required ordinarily with homopolymers. During the depolymerization sulfur dioxide was introduced into the reaction system and allowed to mix with the monomeric vapors which were evolved. The monomer vapors containing sulfur dioxide were condensed and collected in an 80% yield of the mixed monomer. This monomeric mixture was then used directly for bonding such articles as cellulose acetate films, polyterephthalate films, and polyester films, and the bonded areas showed improved flexibility over bonds which were obtained using either of the monomers alone.

*Example 2*

The proportions of the monomers can be varied widely over the range of 5 to 95% by weight of each monomer. Thus, for example, a mixture of 90 parts by weight of methyl α-cyanoacrylate and 10 parts by weight of ethyl cyanoacrylate was prepared by admixing the individual preformed monomers. This composition showed excellent adhesive properties and gave flexible rubbery bonds.

*Example 3*

Similar results were obtained using a mixture of 10 parts by weight of methyl α-cyanoacrylate and 90 parts by weight of ethyl cyanoacrylate.

*Example 4*

Although mixtures of alkyl esters of α-cyanoacrylic acid are usually employed for convenience, any of the alkyl esters can be admixed with phenyl α-cyanoacrylate in amounts of from 5 to 95% by weight based on the combined monomer weight. Thus 20 parts by weight of phenyl α-cyanoacrylate was admixed with 80 parts by weight of ethyl cyanoacrylate to give a composition which gave rubbery flexible bonds when employed for adhering together film materials.

*Example 5*

The polymerization period of the adhesive composition is lengthened by admixing methyl cyanoacrylate with a higher alkyl cyanoacrylate. A mixture of 30 parts by weight of isobutyl α-cyanoacrylate with 70 parts by weight of methyl cyanoacrylate gave excellent adhesion, and the rubbery flexible bond formed more slowly than was the case with mixtures of methyl and ethyl α-cyanoacrylates. The polymerization period can be further extended using a higher alkyl ester as, for example, mixtures including capryl α-cyanoacrylate. This permits minor adjustments in the positioning of the elements being bonded before the adhesive bond has completely set up.

*Example 6*

A mixture of 40 parts by weight of cyclohexyl α-cyanoacrylate and 60 parts by weight of methyl α-cyanoacrylate was an excellent adhesive for a variety of different materials. It showed particular utility in bonding flexible materials since it gave flexible rubbery bonds.

*Example 7*

A mixture of 5 parts by weight of monomeric phenyl α-cyanoacrylate and 95 parts by weight of isobutyl cyanoacrylate gave the desired flexible bonds when employed for adhering together cellulose acetate films.

Similar advantageous results are obtained with other combinations of the monomers as defined herein over the range of proportions as described. Usually mixtures of two monomers are employed, although three or more monomers can be admixed if desired. Desirably, when the adhesive composition is to be stored for any prolonged period of time before use, the composition contains a suitable polymerization inhibitor which is desirably sulfur dioxide. The compositions embodying this invention can be used for bonding together a great variety of similar or dissimilar materials, including rigid materials such as metals, glass, wood, and the like, or flexible materials as already described.

Although the invention has been described in considerable detail with particular reference to certain preferred embodiments thereof, variations and modifications can be effected within the spirit and scope of the invention as described hereinabove and as defined in the appended claims.

We claim:

1. An adhesive composition adapted to form flexible adhesive bonds and comprising a mixture of monomeric α-cyanoacrylate esters consisting of 5–95% by weight of a monomeric ester of α-cyanoacrylic acid from the class having the formula

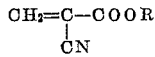

wherein R is a member of the group consisting of alkyl groups of 1 to 16 carbon atoms, cyclohexyl groups and phenyl groups, and 95–5% by weight of a different monomeric ester of α-cyanoacrylic acid from said class, said mixture being stabilized by incorporation therein of at least 0.001% by weight based on the weight of said mixture of an acidic gaseous polymerization inhibitor of the group consisting of sulfur dioxide, nitric oxide, boron trifluoride and hydrogen fluoride.

2. An adhesive composition adapted to form flexible adhesive bonds and consisting of a mixture of 5–95% by weight of monomeric methyl α-cyanoacrylate and 95–5% by weight of a different monomeric ester of α-cyanoacrylic acid of the formula

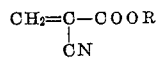

wherein R is from the group consisting of alkyl groups of 1 to 16 carbon atoms, cyclohexyl groups and phenyl groups, said mixture containing 0.001 to 2% by weight based on the weight of said mixture of sulfur dioxide as a polymerization inhibitor.

3. An adhesive composition adapted to form flexible adhesive bonds and consisting of a mixture of at least two alkyl esters of α-cyanoacrylic acid wherein each alkyl group contains 1 to 16 carbon atoms, said mixture containing 0.001 to 2% by weight based on the weight of said mixture, of sulfur dioxide.

4. An adhesive composition adapted to form flexible adhesive bonds and consisting of a mixture of an alkyl ester of α-cyanoacrylic acid in which the alkyl group tains from 1 to 16 carbon atoms and a phenyl ester of α-cyanoacrylic acid, said mixture containing 0.001 to 2% by weight based on the weight of said mixture, of sulfur dioxide.

5. An adhesive composition adapted to form flexible adhesive bonds and consisting of a mixture of a cyclohexyl ester of α-cyanoacrylic acid and an alkyl ester of cyanoacrylic acid wherein the alkyl group contains from 1 to 16 carbon atoms, said mixture containing 0.001 to 2% by weight based on the weight of said mixture, of sulfur dioxide.

6. An adhesive composition consisting of from 5 to 95% by weight of monomeric methyl α-cyanoacrylate and 95 to 5% by weight of a different monomeric alkyl ester of α-cyanoacrylic acid in which the alkyl group contains 2 to 16 carbon atoms, said mixture containing 0.001 to 2% by weight of sulfur dioxide.

7. An adhesive composition consisting of a mixture of 5–95% by weight of monomeric methyl α-cyanoacrylate and 95% by weight of monomeric ethyl α-cyanoacrylate, said composition including 0.001 to 2% by weight of sulfur dioxide based on the weight of said mixture.

8. An adhesive composition consisting of a mixture of a major proportion of methyl α-cyanoacrylate and a minor proportion of cyclohexyl α-cyanoacrylate stabilized with 0.001 to 2% by weight of sulfur dioxide based on the weight of said mixture.

9. A laminated article comprising at least two elements adhered together by a flexible polymerized film resulting from the polymerization in situ of a mixture of polymerizable monomers consisting of α-cyanoacrylate esters of the formula

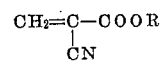

wherein R is selected from the group consisting of alkyl groups of 1 to 16 carbon atoms, cyclohexyl groups and phenyl groups.

10. A flexible laminated article comprising at least two flexible elements adhered together by a flexible polymerized film resulting from the polymerization in situ of a mixture of polymerizable monomers consisting of α-cyanoacrylate esters of the formula

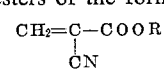

wherein R is selected from the group consisting of alkyl groups of 1 to 16 carbon atoms, cyclohexyl groups and phenyl groups, a major portion of said mixture being a lower alkyl α-cyanoacrylate.

11. A flexible laminated article comprising at least two flexible elements adhered together by a flexible polymerized film resulting from the polymerization in situ of a mixture of polymerizable monomers consisting of α-cyanoacrylate esters of the formula

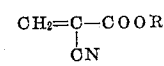

wherein R is selected from the group consisting of alkyl groups of 1 to 16 carbon atoms, cyclohexyl groups and phenyl groups, a major portion of said mixture being methyl α-cyanoacrylate.

References Cited in the file of this patent

UNITED STATES PATENTS

| 2,346,858 | Mighton | Apr. 18, 1944 |
| 2,467,927 | Ardis | Apr. 19, 1949 |
| 2,492,170 | Mast et al. | Dec. 27, 1949 |
| 2,535,827 | Ardis et al. | Dec. 26, 1950 |
| 2,672,477 | Heinemann | Mar. 16, 1954 |